Figure 5:
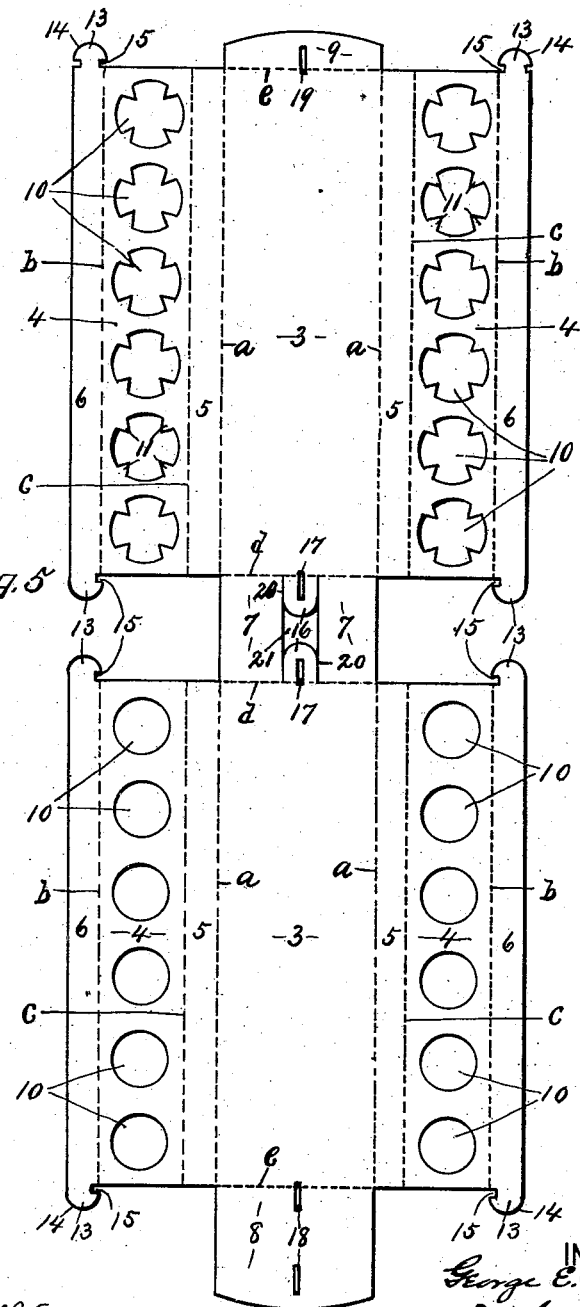

No. 705,286. Patented July 22, 1902.
G. E. PALMER & J. N. LAKE.
EGG CRATE.
(Application filed Oct. 15, 1900.)
(No Model.) 2 Sheets—Sheet 1.
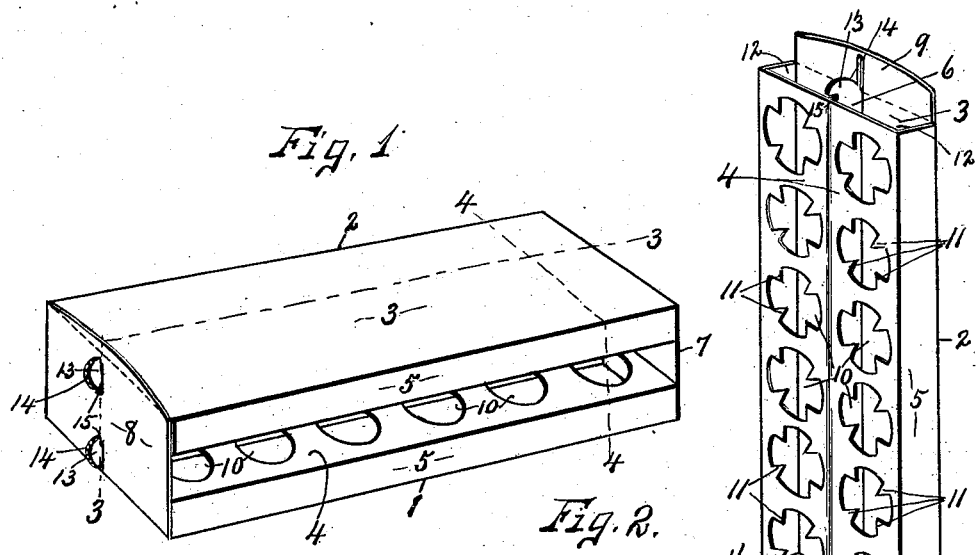
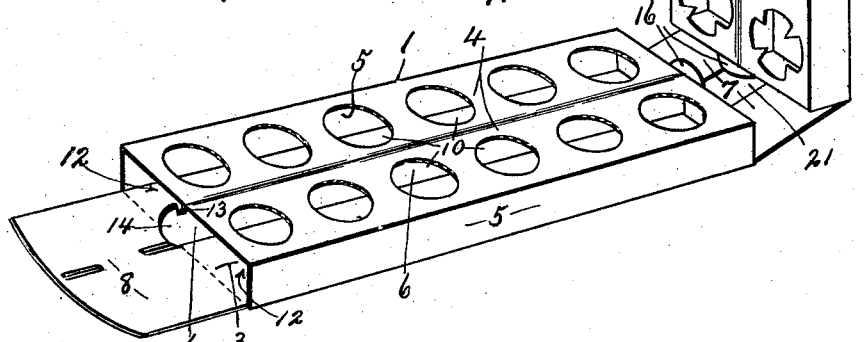
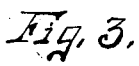
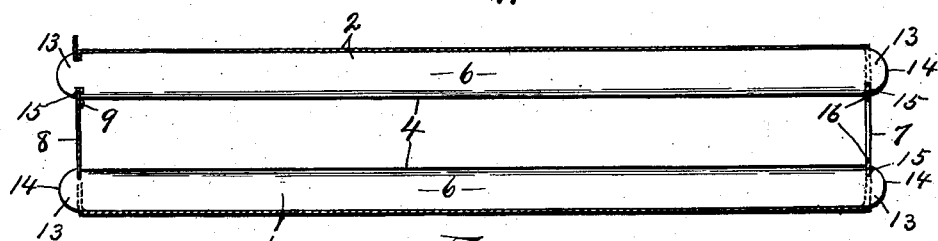
WITNESSES.
INVENTORS
George E. Palmer and
Judson N. Lake
BY
Smith & Denison
ATTORNEYS.

No. 705,286. Patented July 22, 1902.
G. E. PALMER & J. N. LAKE.
EGG CRATE.
(Application filed Oct. 15, 1900.)

(No Model.) 2 Sheets—Sheet 2.

WITNESSES:
F. E. Arthur,
H. E. Chase.

INVENTORS
George E. Palmer and
Judson N. Lake
BY
Smith & Davison
ATTORNEYS.

UNITED STATES PATENT OFFICE.

GEORGE E. PALMER AND JUDSON N. LAKE, OF ELMIRA, NEW YORK.

EGG-CRATE.

SPECIFICATION forming part of Letters Patent No. 705,286, dated July 22, 1902.

Application filed October 15, 1900. Serial No. 33,107. (No model.)

*To all whom it may concern:*

Be it known that we, GEORGE E. PALMER and JUDSON N. LAKE, of Elmira, in the county of Chemung, in the State of New York, have invented new and useful Improvements in Egg-Crates, of which the following, taken in connection with the accompanying drawings, is a full, clear, and exact description.

This invention relates to improvements in egg-crates, the object being to produce a simple and practical device which may be manufactured at a minimum cost from a single blank or sheet of cardboard or similar material and shipped in blank form to the consumer to be folded and used for safely transporting or delivering eggs in small quantities.

To this end the invention consists in the construction and formation of an egg crate or receptacle, as hereinafter fully described, and pointed out in the claims.

Referring to the drawings, Figure 1 is a perspective view of my invention shown in its folded or operative position when filled with eggs for delivery. Fig. 2 is a perspective view of the device seen in Fig. 1, one of the opposite sections being folded upwardly for permitting the insertion or removal of the eggs from the pockets. Figs. 3 and 4 are sectional views taken on lines 3 3 and 4 4, Fig. 1. Fig. 5 is a plan view of the blank for forming the device seen in Figs. 1 and 2.

Our improved egg-crate consists, essentially, of a plurality of similarly-formed hollow box-sections 1 and 2, united to each other and adapted to be folded one upon the other in substantially parallel planes, with their adjacent walls separated and provided with apertures or pockets for receiving the opposite ends of the eggs and holding the same safely and firmly from injury when the sections are folded one upon the other during transportation or delivery. These hollow sections may be of any suitable size, form, or material and preferably consist of substantially rectangular hollow bodies formed of flexible material, such as cardboard, and are each provided with outer and inner walls 3 and 4, lengthwise side and intermediate substantially parallel walls 5 and 6, and end walls 7, 8, and 9. The outer and inner walls 3 and 4 of each section are arranged in separated planes substantially parallel with each other, the outer walls 3 being preferably unbroken throughout their entire surfaces and the inner walls 4 being provided with a plurality of rows of apertures or pockets 10 at each side of the walls 6, which may be of any suitable size or form for receiving the eggs and holding the same from lengthwise or lateral movement during transportation or delivery. As seen in the drawings, these openings 10 of the sections 1 and 2 are substantially circular in form, the apertures of the section 2 being of slightly-greater diameter than the apertures of the section 1, and their walls are formed with inwardly-tapering projecting shoulders 11, which serve to readily conform to the various sizes of eggs inserted therein and to hold said eggs from displacement when the sections are folded together. The inner walls 4 are preferably divided longitudinally between the rows of apertures, and the adjacent edges of such divisions are bent outwardly toward the walls 3 for dividing the chamber of each section into separate compartments. The side walls 5 of each section are disposed in substantially parallel planes, are usually of the same length as the inner walls 4, and serve to unite the corresponding lengthwise edges of the outer and inner walls in their separated relation to each other. The intermediate walls 6 of each of these sections are arranged substantially parallel with and midway between the respective side walls 5 and serve to support the intermediate portions of the walls 3 and 4 and to divide the chambers of the respective sections into separated lengthwise compartments 12, each having a row of apertures 10 communicating therewith. These partitions or walls 6 are usually of greater length than the inner wall 4 and extend beyond the opposite ends of said inner wall for forming suitable locking-shoulders 13, which are provided with rounded end faces 14 and recesses or notches 15 for a purpose hereinafter mentioned.

The end wall 7 is generally formed of the same width as the hollow sections 1 and 2, is of greater length than the combined depth of the sections 1 and 2, and is flexibly united at its opposite ends to the adjacent ends of the outer walls 3 for forming a hinge connection between said sections and additionally holding the inner walls of the sections in separated relation to each other. The intermediate portion of the end wall 7 is partially cut away and suitably slitted or cut to form independently-movable tongues 16, which are flexibly united at one end to the adjacent ends of the outer walls 3, and their free ends are movable and are formed with slits or slots 17 for receiving the projecting ends 13 of the partitions or walls 6 when said free ends are folded toward the shoulders 13, the rounding end faces 14 of said partitions serving to permit these tongues to be readily folded, as described.

The end wall 8 is formed of substantially the same width and length as the wall 7, is united at one end to the opposite end of the outer wall of the section 1, with its free end movable toward and away from the adjacent end faces of the sections 1 and 2, and is provided with elongated slits or slots 18, adapted to receive the adjacent projecting ends of the partitions 6. When the slits of the tongues 16 and end wall 8 are thus registered with the corresponding ends of the partitions 6, the end walls of said slits engage the walls of the recesses 15 and serve to hold the walls 3 and 4 of each section in their proper position relative to each other.

The end wall 9 is united at one end to the free end of the outer wall of the section 2, is usually of substantially the same width and depth as said section 2, and is formed with an elongated slit or slot 19 for receiving the adjacent end of the partition 6 before the free ends of the sections 1 and 2 are locked together by the end wall 8, it being understood that the walls of these slits interlock with the walls of the recesses of the adjacent ends of the partitions 6 in the usual manner for the flaps of folding boxes.

Although the various walls and partitions of our improved egg-crate may be manufactured in parts and assembled in the manner above described, we preferably construct the same from a single blank or piece of cardboard or similar material, which is cut, scored, or creased and folded to form all of the parts of our invention hereinbefore described. At Fig. 5 we have shown such a blank for forming the egg-crate seen in the drawings and described herein; but it will be evident that some changes may be made in the formation of the blank without changing the general form and operation of the crate seen in the drawings—as, for instance, the projecting ends of the partitions 6 might be omitted and the end walls 8 and 9 secured together in any other suitable manner for the purpose desired—and that the same blank might be duplicated in the same piece without departing from the spirit of this invention. As seen in Fig. 5, this blank consists of an elongated rectangular sheet having its intermediate and end portions reduced in width for forming the end walls 7, 8, and 9 of the sections, the enlarged portions being adapted to form the lengthwise outer, inner, and side walls of the hollow box-sections. These enlarged portions are provided with separated intermediate parallel scores or creases $a$, alined with the longitudinal edges of the walls 7, 8, and 9 for forming the adjacent longitudinal edges of the lengthwise outer and side walls 3 and 5 opposite outer scores $b$, arranged parallel with the scores $a$ for forming the adjacent lengthwise edges of the inner walls 4 and partitions 6, additional lengthwise scores or creases $c$ interposed between the scores $a$ and $b$ for forming the adjacent longitudinal edges of the inner walls 4 and side walls 5, intermediate transverse scores $d$, forming the adjacent edges of the lengthwise outer walls 3 and end wall 7, and additional transverse scores $e$, which form the adjacent edges, respectively, of the outer walls 3 and the end walls 8 and 9. The opposite transverse end faces of the enlarged portions of the blank are arranged substantially parallel with each other, said enlarged portions being formed of substantially the same length between their end edges, and are provided with portions extending beyond their end edges and alined with the spaces between the lengthwise edges of the blank and the scores $b$ for forming the shoulders 13 at the ends of the partitions 6. These shoulders 13 are formed with recesses 15, extending outwardly from their inner edges. The reduced portion at one end of the blank for forming the end wall 9 extends beyond the transverse score $e$ a distance substantially equal to the distance between the lengthwise scores $a$ and $c$ and is provided with a lengthwise slit or slot 19. The distance between the adjacent end edges of the enlarged portions of the blank is greater than the combined distances between the scores $a$ and $c$ of one of the enlarged portions of the blank, and the intermediate reduced portion for forming the end wall 7 is provided with parallel lengthwise edges alined with the lengthwise scores $a$ and is also formed with separated substantially central lengthwise slits 20 and a transverse cut-out 21 for forming the tongues 16, which are each provided with lengthwise slits or slots 17. The adjacent transverse edges of the enlarged portion of the blank are substantially parallel with each other and are coincident with the transverse scores $d$. The opposite reduced end of the blank for forming the end wall 8 is provided with parallel lengthwise sides coincident with the scores $a$ and extends beyond the adjacent transverse score $e$ a distance substantially equal to the distance between the adjacent end faces of said enlarged portions or, in other words, substantially equal to the distance between the scores $d$, and is formed with lengthwise substantially central slits or slots 18, arranged one in advance of the other. The portions of the blank between the scores $b$ and $c$ are provided with a series of circular apertures arranged one in advance of the other for forming the openings 10, the walls of the apertures of one of the enlarged portions being formed with the inwardly-tapering shoulders 11. The scores which form the longitudinal edges of the side walls 5 and inner walls 4 are separated from each other substantially the same distance, and the scores b, which form the adjacent edges of the inner wall 4 and partitions, are separated from the lengthwise edges of the blank substantially the same distance as the distance between the adjacent scores a and c.

Having fully described our invention, what we claim, and desire to secure by Letters Patent, is—

1. An egg-crate comprising box-bodies united end to end, each having opposite lengthwise flaps provided with lengthwise rows of openings and adapted to be folded inwardly to form separate lengthwise compartments open from end to end, the box-bodies folding one over the other lengthwise of the compartments.

2. An egg-crate comprising box-bodies united end to end, each having opposite lengthwise flaps provided with lengthwise rows of openings and adapted to be folded inwardly to form separate lengthwise compartments open from end to end, the box-bodies folding one over the other lengthwise of the compartments and the free ends of each body having interlocking members integral therewith to hold the lengthwise flaps in their inwardly-folded position.

3. An egg-crate comprising box-bodies united end to end, each having opposite lengthwise flaps provided with lengthwise rows of openings and adapted to be folded inwardly to form separate lengthwise compartments open from end to end, the box-bodies folding one over the other lengthwise of the compartments and the adjacent united ends of each body having interlocking members integral therewith to hold the lengthwise flaps in their inwardly-folded position.

4. An egg-crate comprising box-bodies united end to end, each having opposite lengthwise flaps provided with lengthwise rows of openings and adapted to be folded inwardly to form separate lengthwise compartments open from end to end, the box-bodies folding one over the other lengthwise of the compartments and the opposite ends of each body having interlocking members formed integral therewith to hold the lengthwise flaps in their inwardly-folded position.

5. An egg-crate comprising box-bodies united end to end, each having opposite lengthwise flaps provided with lengthwise rows of openings and adapted to be folded inwardly to form separate lengthwise compartments open from end to end, the box-bodies folding one over the other lengthwise of the compartments and the free ends of the bodies having interlocking members.

6. An egg-crate comprising box-bodies united end to end, each having opposite lengthwise flaps provided with lengthwise rows of openings and adapted to be folded inwardly to form separate lengthwise compartments open from end to end, the box-bodies folding one over the other lengthwise of the compartments and the free ends of the bodies having interlocking members said members being arranged to hold the inner walls of the folded bodies separated one from the other.

7. A blank for forming the herein-described egg-crate consisting of a single piece of suitable material of sufficient length to form two similar hollow box-sections folding lengthwise one over the other, said blank having parallel scores forming the corners of the outer and side walls of each section, the central portions of the blank at opposite sides of said scores being cut away to form opposite similar flaps for each section, and the flaps are each provided with parallel scores and a row of openings lengthwise between the latter scores, said latter scores forming the corners of the inner and side walls and also the corners of the inner and central lengthwise wall or partitions.

8. A blank for forming the herein-described egg-crate consisting of a single piece of suitable material of sufficient length to form two similar hollow box-sections folding lengthwise one over the other, said blank having parallel scores forming the corners of the outer and side walls of each section, the central portions of the blank at opposite sides of said scores being cut away to form opposite similar flaps for each section, and the flaps are each provided with parallel scores and a row of openings lengthwise between the latter scores, said latter scores forming the corners of the inner and side walls and also the corners of the inner and central lengthwise wall or partitions, the adjacent ends of the lengthwise flaps being separated a distance greater than the distance between the scores forming the edges of the side walls.

9. A blank for forming the herein-described egg-crate consisting of a single piece of suitable material of sufficient length to form two similar hollow box-sections folding lengthwise one over the other, said blank having parallel scores forming the corners of the outer and side walls of each section, the central portions of the blank at opposite sides of said scores being cut away to form opposite similar flaps for each section, and the flaps are each provided with parallel scores and a row of openings lengthwise between the latter scores, said latter scores forming the corners of the inner and side walls and also the corners of the inner and central lengthwise wall or partitions, the adjacent ends of the lengthwise flaps being separated a distance greater than the distance between the scores forming the edges of the side walls and the blank having transverse scores alined with the adjacent ends of the flaps to form the corners of one end wall and the outer walls.

10. A blank for forming the herein-described egg-crate consisting of a single piece of suitable material of sufficient length to form two similar hollow box-sections folding lengthwise one over the other, said blank having parallel scores forming the corners of the outer and side walls of each section, the central portions of the blank at opposite sides of said scores being cut away to form opposite similar flaps for each section, and the flaps are each provided with parallel scores and a row of openings lengthwise between the latter scores, said latter scores forming the corners of the inner and side walls and also the corners of the inner and central lengthwise wall or partitions, the adjacent ends of the lengthwise flaps being separated a distance greater than the distance between the scores forming the edges of the side walls and the blank having transverse scores alined with the adjacent ends of the flaps to form the corners of one end wall and the outer walls, the portions forming said end wall and the adjacent ends of the flaps having interlocking members.

11. A blank for forming the herein-described egg-crate consisting of a single piece of suitable material of sufficient length to form two similar hollow box-sections folding lengthwise one over the other, said blank having parallel scores forming the corners of the outer and side walls of each section, the central portions of the blank at opposite sides of said scores being cut away to form opposite similar flaps for each section, and the flaps are each provided with parallel scores and a row of openings lengthwise between the latter scores, said latter scores forming the corners of the inner and side walls and also the corners of the inner and central lengthwise wall or partitions, the adjacent ends of the lengthwise flaps being separated a distance greater than the distance between the scores forming the edges of the side walls and the blank having transverse scores alined with the adjacent ends of the flaps to form the corners of one end wall and the outer walls, the portions forming said end wall and the adjacent ends of the flaps and also the extreme ends of the blank having interlocking members.

In witness whereof we have hereunto set our hands this 9th day of October, 1900.

GEORGE E. PALMER.
JUDSON N. LAKE.

Witnesses:
L. D. SHOEMAKER,
JOHN G. POTTER.